United States Patent [19]

Marcuard

[11] Patent Number: 5,343,210

[45] Date of Patent: Aug. 30, 1994

[54] SATELLITE RADIONAVIGATION RECEIVER

[75] Inventor: Alain Marcuard, Elancourt, France

[73] Assignee: Thomson-CSF, Puteaux, France

[21] Appl. No.: 924,039

[22] PCT Filed: Mar. 15, 1991

[86] PCT No.: PCT/FR91/00210

§ 371 Date: Sep. 9, 1992

§ 102(e) Date: Sep. 9, 1992

[30] Foreign Application Priority Data

Mar. 16, 1990 [FR] France .................. 90 03387

[51] Int. Cl.⁵ .................. H04B 7/185; H04B 15/00
[52] U.S. Cl. .................. 342/352; 375/1
[58] Field of Search .................. 342/352, 356, 357; 375/1

[56] References Cited

U.S. PATENT DOCUMENTS

| | | | |
|---|---|---|---|
| 4,754,465 | 6/1988 | Trimble | 375/417 |
| 4,800,577 | 1/1989 | Tachita et al. | 342/417 |
| 4,910,525 | 3/1990 | Stulken | 342/418 |
| 5,048,053 | 9/1991 | Mower et al. | 375/1 |
| 5,113,443 | 5/1992 | Brockman | 375/1 |

FOREIGN PATENT DOCUMENTS

| | | |
|---|---|---|
| 3031190 | 3/1982 | Fed. Rep. of Germany . |
| 3131187 | 2/1983 | Fed. Rep. of Germany . |
| 3808328 | 6/1989 | Fed. Rep. of Germany . |

OTHER PUBLICATIONS

Funkschau, vol. 58, No. 19, Sep. 1986 (Munich, DE) Bohm: "Positionsbestimmung" pp. 49–52, voir page 52, colonne 2, Lignes 48–60; FIG. 4.

*Primary Examiner*—Gregory C. Issing
*Attorney, Agent, or Firm*—Oblon, Spivak, McClelland, Maier & Neustadt

[57] ABSTRACT

A receiver of satellite signals which features a reception chain coupled to a navigation processor. The reception chain is of a homodyne type and is formed by a single frequency-conversion stage followed by an amplifier chain coupled to an encoding circuit for encrypting the signals travelling between each amplifier before their transmission to the navigation computer. Such a device finds particular application in C/A code GPS satellite radionavigation system.

9 Claims, 5 Drawing Sheets

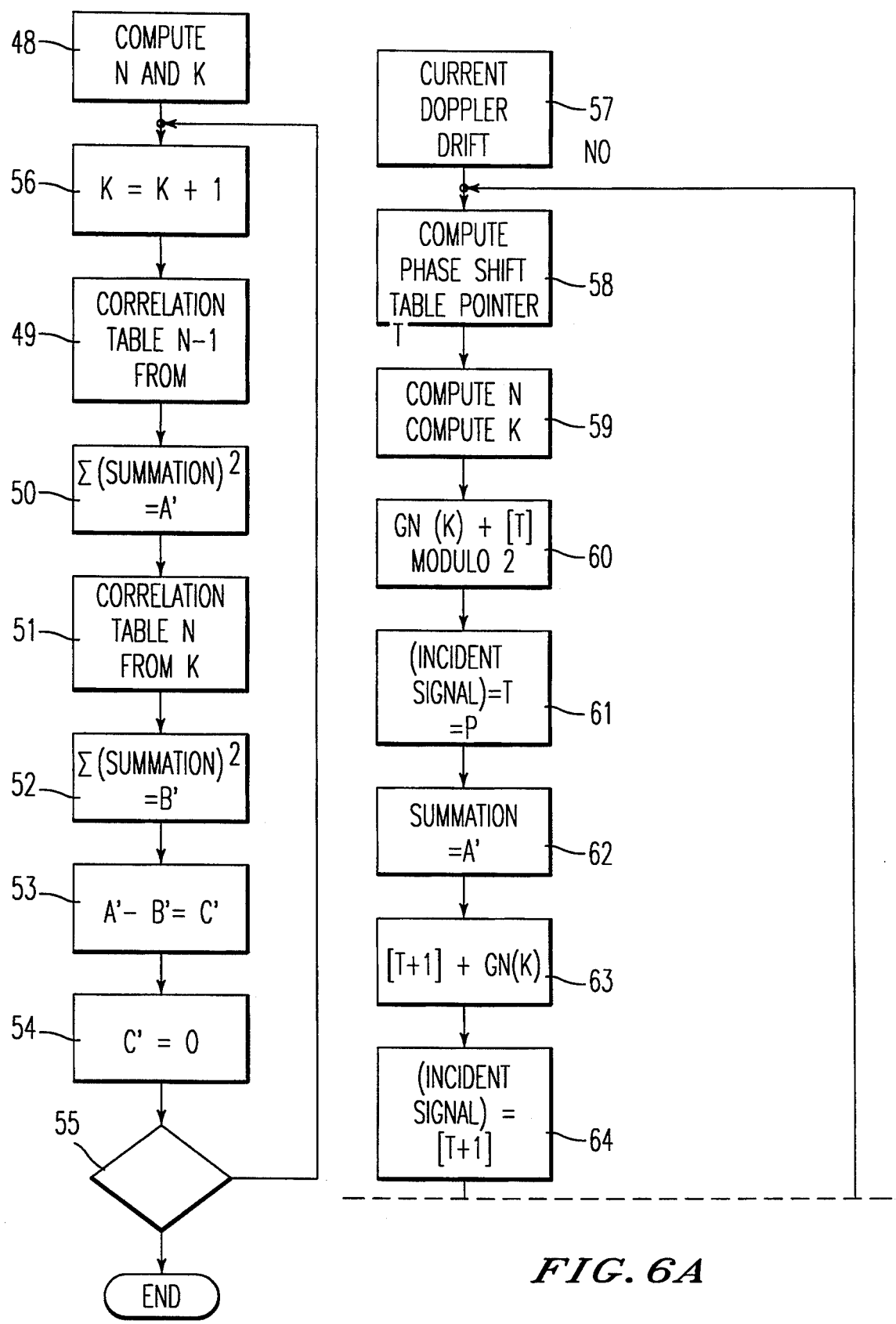

SATELLITE RADIONAVIGATION RECEIVER

BACKGROUND OF THE INVENTION

1. Field of the Invention

The present invention relates to a satellite radionavigation receiver.

It applies in particular to the construction of a receiver of the known system of C/A code GPS satellite radionavigation, descriptions of which can be found in the publications from the Institute of Navigation, Washington D.C., entitled "Global positioning system" No. 0.936406-01-1 and No. 0.936406-00-3.

2. Discussion of the Background

In the C/A code GPS system each radionavigation receiver receives spectrally spread signals at the 1575.42 MHz frequency. These signals which are emitted by the satellites of the system, are gathered on the ground by an aerial of hemispherical radiation pattern, with a very weak signal level, of the order of $-133$ dBm for each satellite received. The signal received is demodulated by a receiver linked to the aerial which extracts therefrom, on the one hand, almanac and ephemeris information and, on the other hand, information about the time of propagation to the receiver of the signals emitted by the satellites and about the Doppler shift in their reception frequency. The almanac and ephemeris information is supplemented with correction coefficients which are specific to each of the satellites tracked by the receiver, and all this information is overlaid on their spread spectrum pseudo-random code. The almanac and ephemeris information enable a navigation computer to compute, at any instant, the position of the satellites tracked by the receiver. The information relating to the time of reception of the signals from the satellites and to the Doppler shift enable the navigation computer to ascertain the separation and inherent speed of the satellites tracked.

Based on the preceding information, the main tasks of the navigation computer are to compute the position of the receiver relative to the tarestrial geoid and possibly to deliver the universal time coordinated, UTC. Other cosmographical functions may also be grafted onto the main functions described earlier and in particular the functions required for navigation in specified zones of the geoid.

According to a known structure of GPS receivers, the signals from an aerial are amplified and converted into baseband analog signals by a superheterodyne receiver, generally with double frequency-conversion, owing to the large gain which must be produced. The signals obtained are possibly digitised and three processing operations are carried out on the baseband signals obtained. A first processing operation consists in performing a lead/lag correlation with a replica of the spread spectrum pseudo-random code received from the satellite in order to finely encode the distance, also called the pseudo-distance, separating the satellite from the receiver. The second processing operation consists in performing a correlation by "costas" loop with a reference clock in order to encode the rate of displacement of the satellite along the satellite/receiver radius vector, this measurement being called the "satellite delta pseudo distance" measurement. Lastly, the third processing operation consists in performing a final correlation with the reference clock in order to demodulate the DPSK almanac and ephemeris data signals and the correction coefficients overlaid on the satellite's spread spectrum code. This latter processing operation also yields a rough encoding of the satellite distance which is supplemented by the first processing operation to obtain the real pseudo distance. All these data are next processed by a navigation processor which deduces from them the position of the receiver and the time. Natually, implementing of this structure requires the use of a significant number of components which limits, for reasons of cost and size, exploitation of the receivers to a reduced number of channels.

SUMMARY OF THE INVENTION

The aim of the invention is to alleviate the abovementioned disadvantages.

To this end, the subject of the invention is a satellite radionavigation receiver of the type comprising a reception chain coupled to a navigation processor, characterised in that the reception chain is of a homodyne type and is formed by a single frequency-conversion stage followed by an amplifier chain coupled to an encoding circuit for encoding the signals travelling between each amplifier before their transmission to the navigation computer.

The advantage of the invention is that it permits very economical construction of C/A code GPS receivers, even for small production runs. By comparison with a conventional superheterodyne receiver, the receiver according to the invention has the advantage of possessing just one frequency-conversion stage for reducing the signals received directly to baseband. As the useful baseband signal of the C/A GPS code consists of a sin X/X lobe of width 2 MHz centred at the frequency origin, the design logic of a homodyne receiver would have it consist only of two intermediate frequency paths, a phase path I and a quadrature path Q with passbands included between 0 to 1 MHz within a perfectly matched (in the mathematical sense of the term) processing chain. However, according to the invention, the structure of the receiver is yet further simplified since the receiver possesses just a single intermediate frequency path processing signals over a passband of 2 MHz centred on the 1 MHz frequency. The advantage of this arrangement is that it divides the cost of construction of the intermediate frequency stages and avoids the problems of pairing I and Q paths at the cost, however, of twice as large a passband and digitisation at double frequency (4 MHz instead of 2 times 2 MHz). However, this does not present any manifest difficulties of construction owing to the lowish frequencies involved, even though the signal/noise ratio diminishes in the intermediate frequency amplifier because the noise band corresponding to the negative frequencies, which does not carry the signal, is also amplified. This loss is, however, tolerable considering the fact that the usual satellites have energy budgets of the order of 40 dBHz and that a degradation of only 3 dB in this budget does not seem significant. Moreover, the encoding technique makes it possible to distribute the total intermediate frequency gain, which is extremely high, over N amplification stages of similar composition, for which the passbands of the filters which are associated with them can, however, vary with the solution for the encoding adopted. Another advantage is that it is not necessary in order to construct the filters to resort to critical profiles and the Q-factors can be chosen small enough to allow construction without adjustment, with components of standard tolerance (10%). In practice, the use of Bessel filters of order 3 is entirely satisfactory. Moreover, the implementing of an encoding circuit offers the immense advantage of rendering the receiver insensitive to drifts in the gain of the amplifiers regardless of their cause, heat or spread in their manufacturing characteristics for example and of not creating image frequencies outside the passband of the receiver.

Another attraction of the invention is that it enables the baseband information to be processed with a program which can be executed by a digital signal processing processor, this having the advantage of simplifying the reception reference clock since the long-term drifting of the local oscillator due to ageing and to thermal drifting can be processed digitally. Hence, it is no longer necessary to provide a thermostat for the local oscillator or to impose especially tight long-term drift specifications on it as in the other types of GPS receivers.

The homodyne structure implemented in the receiver of the invention also enables the structure of the reference clock of the receiver to be simplified. As the intermediate frequency is unique, the local oscillator of the receiver is thus reduced to its simplest expression, since there is just one local frequency to be produced for the high-frequency head. However, the necessity to digitise the information requires, downstream, the provision of a sampling frequency whose relative stability characteristics must be of the same order as those of the local oscillator of the receiver so as not to disturb the baseband processing operations.

BRIEF DESCRIPTION OF THE DRAWINGS

Other characteristics and advantages of the invention will emerge below by virtue of the description which follows given with reference to the attached drawings which represent:

FIGS. 4 to 6, flow diagrams illustrating the methods of demodulation and code recognition implemented by the invention in order to allow recognition of the carrier waves of the signals transmitted by the satellites and of the corresponding GPS codes.

DESCRIPTION OF THE PREFERRED EMBODIMENTS

Figure 1:
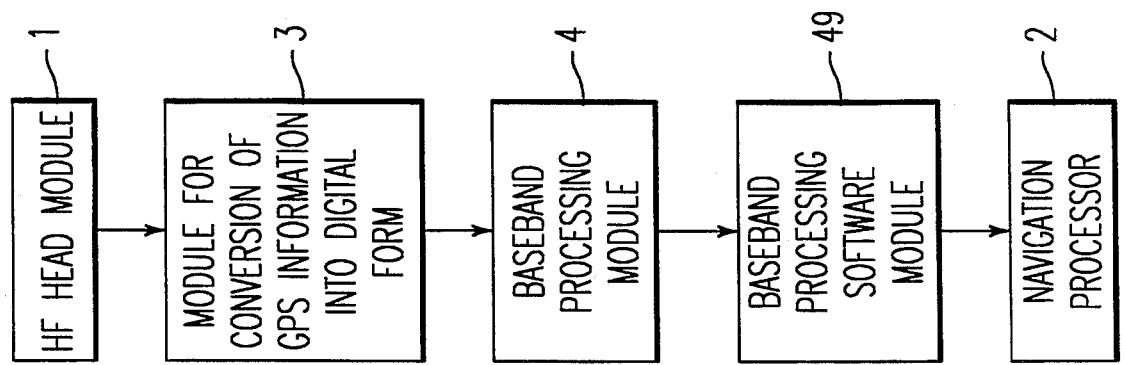
FIG. 1, the organisation of a GPS receiver according to the invention.

The hardware organisation of the receiver according to the invention, which is represented in FIG. 1, comprises an HF head module 1 coupled to a navigation processor 2 through a module 3 for conversion of GPS information into digital form and through a baseband processing module 4 controlled by a software module 4a.

Figure 2:
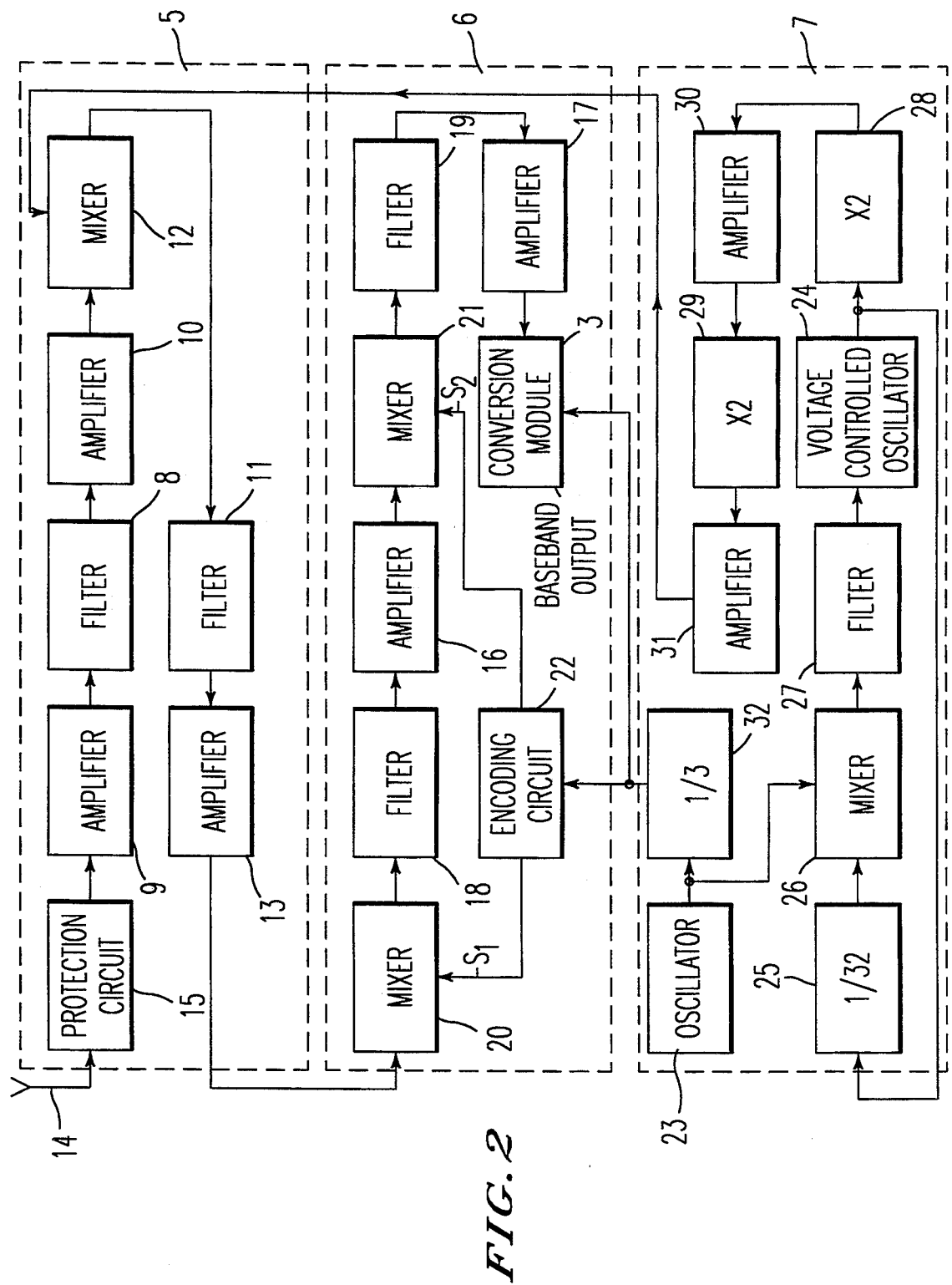
FIG. 2, an embodiment of the high-frequency head of the receiver of FIG. 1.

The HF head module 1 is represented in FIG. 2 connected to a module 3 for conversion of GPS information into digital form. It includes, represented inside a closed dashed line, a homodyne receiver 5, an amplification chain 6 and a frequency generator 7. The homodyne receiver 5 includes a first filter 8 tuned to the 1575.42 MHz frequency and interposed between two monolithic microwave amplifier circuits 9, 10 and a second low-pass filter 11 with a cutoff frequency of 2 MHz. A ring mixer circuit 12 is interposed between the output of the amplifier 10 and the input of the filter 11 in order to transpose the 1575.42 MHz frequency applied to a first input of the mixer circuit 12 into a frequency of 1 MHz equal to half the passband of the filter 11. This translation takes place by applying a signal of frequency 1574.42 MHz to the second input of the mixer circuit 12. The signal obtained at the output of the filter 11 is amplified by an amplifier 13 before being transmitted to the amplification chain 6. The GPS signal is transmitted to the input of the amplification circuit 9 by an aerial 14 connected to the amplification circuit 9 through, possibly, a protection circuit 15 producible by any known means, not shown. The encoding amplification chain 6 includes two low-gain (typically 30 dB) amplifier circuits 16 and 17 which are connected by their inputs to two low-pass filters 18 and 19 whose characteristics are identical to those of the filter 11. Two ring mixer circuits 20 and 21 are placed respectively between the inputs of the filters 18 and 19 and the outputs of the amplifiers 13 and 16. An encoding circuit 22 applies two encoding signals S1 and S2 respectively to a first input of the mixer circuit 20 and 21, the second inputs of the mixer circuits 20 and 21 being connected to the outputs of the amplifier 13 and of the amplifier 16 respectively. The encoding circuit 22 makes it possible, on the one hand, to partition the amplifier into low-gain stages in such a way that inside it the couplings have no significant effects, and on the other hand, to apply a signal-matched transformation to the signal present between the stages such that the spectrum of this signal remains globally invariant and not finely invariant within the transformation. Hence, the encoding operation which is applied to the signal between the stages preserves the whole of the spectrum while, however, modifying the location of each of its lines. The stability of each amplifier must then be studied by performing a conventional frequency stability analysis via the known Bode, Black or Nyquist etc. diagrams, and by taking into account the spectral or pulse characteristics of the relevant encoding. Although a priori any known encoding device may be used, the encoding of the signals travelling between two successive amplifiers can advantageously be carried out by means either of a first encoding by sample sign inversion, or possibly by a second encoding by pseudo-orthogonal Gold code correlation.

According to the first mode of encoding, each of the lines of the signal spectrum is translated into a line of like amplitude but has a symmetric frequency with respect to a central frequency. Applied to the embodiment of FIG. 2, the global invariance of the spectrum forces a choice of inversion frequency in the vicinity of 2 MHz. The encoding codes $S_i$ are defined by choosing two codes S1 and S2 from, for example, six successive samples of codes $l_1$ to $l_6$, defined as follows:

$l_1 = 111000$
$l_2 = 011100$
$l_3 = 001110$
$l_4 = 000111$
$l_5 = 100011$
$i_6 = 110001$

A corresponding encoding circuit 22 can then be formed by a simple programmed logic circuit. As the interpolation half-frequency (about 1 MHz) is finely invariant within the transformation, the intermediate frequency amplification stage must exhibit a 0 in transmission at this frequency in order to conserve the gain decoupling characteristics of the encoding in order to guarantee stability. However, this cannot be regarded as a disadvantage since the information carried by this frequency component is duplicated on all the other lines of the sin X/X spectrum.

According to the second mode of encoding by pseudo-orthogonal Gold correlation, each spectral line of the signal is spread into a lobe of secondary lines by means of DPSK phase shifting with a locally-produced spread spectrum code. For obvious reasons of convenience of construction, the pseudo-random local spread code can advantageously be synchronised with the sampling clock. In particular, it can happen that choosing a local code moment length different to that of the incident codes may improve performance in the rejection of residues of cross-correlation between the local spread code, hereinafter denoted L0 code, and the spread code from the satellites tracked by the receiver.

As the C/A GPS codes are usually formed from 36 Gold codes with 1023 moments, clocked at 1.23 Mbits per second and are chosen from a family F of 1025 possible orthogonal codes and since these codes are obtained by forming the product of two pseudo-random sequences P1 and P2 corresponding to the looping with generating polynomials of the type $1+X^3+X^{10}$ and $1+X^2+X^3+X^6+X^8+X^9+X^{10}$ of a shift register of length 10 bits, it is possible to profit from the low cross-correlation characteristics of the Gold codes of the same family by using, as spread code L0, any one of the 989 codes of the family F which are not used by the GPS codes.

This enables the encoding circuit to be produced easily by means of a programmable logic array formed by two shift registers programmed to generate the sequences P1 and P2, and of two EXCLUSIVE OR circuits taking shifted samples from these registers in order to produce different Gold code ranks S1 and S2, sequenced with a clock frequency equal to 1/12 times the reference frequency 12.3 MHz, namely 1.25 MHz.

As the set of Gold codes equipped with the operation of addition modulo 2 forms a complete closed field, the product of two Gold codes from the same family yields a code from the same family, and strict global invariance of the spectrum during the transformation is thus guaranteed. Under these conditions the filters associated with the intermediate frequency stages 11, 18 and 19 can advantageously all be chosen to be identical and of passband equal to 2 MHz.

The frequency generator 7 includes a quartz reference oscillator 23 coupled to a phase-locked loop formed in a known manner by a voltage-controlled oscillator 24, a frequency divider 25, a ring mixer circuit 26, and a low-pass filter 27 with a cutoff frequency 2 MHz. The frequency generator 7 provides a signal of frequency 1574.42 MHz by multiplying by four the frequency provided by the phase-locked loop through two multiplier-by-two circuits 28 and 29 and two amplifiers 30 and 31. A second signal of frequency 4.100 MHz is also obtained at the output of the frequency generator 7 on the output of a divider-by-three circuit 32 for the frequency provided by the oscillator 23.

The module for conversion of the GPS information into digital form, represented with the reference 33 in FIG. 2, is coupled to the output of the amplification circuit 17. It is formed in a known manner, not represented, by a sample-and-hold circuit, a 0 level voltage comparator and a toggle circuit controlled by the sampling clock.

Figure 3:
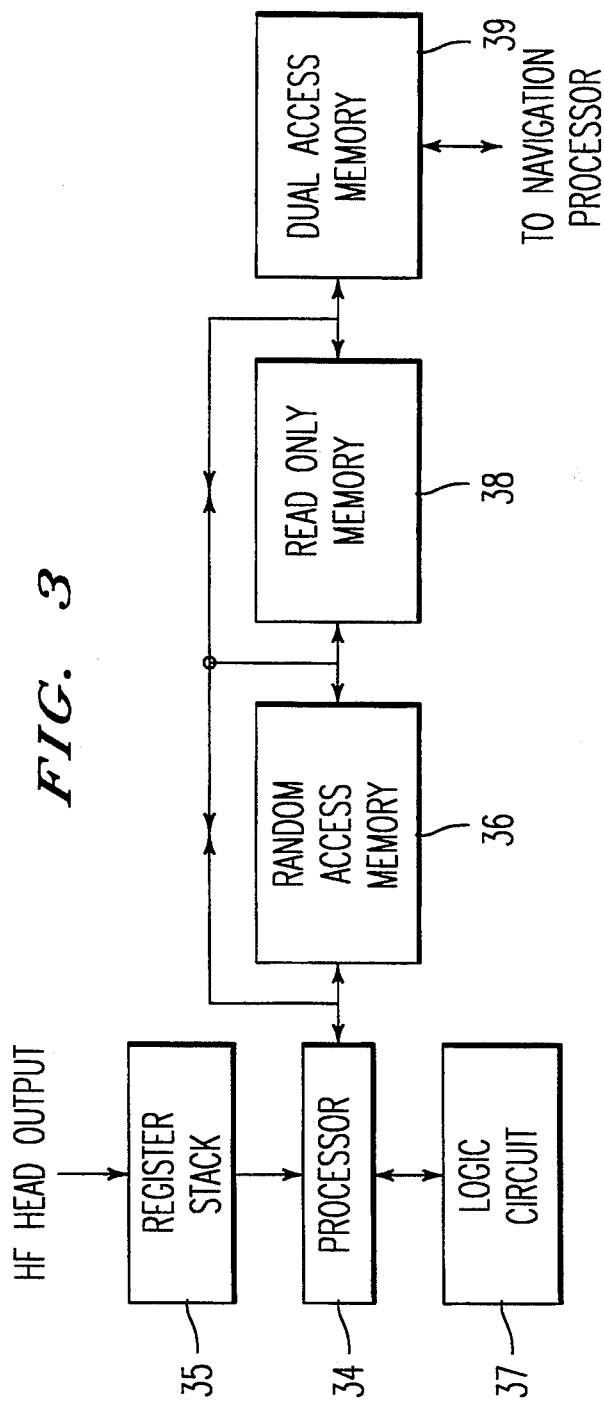
FIG. 3, an embodiment of the baseband processing module of the receiver of FIG. 1.

The baseband processing module which is represented in FIG. 3 comprises a digital signal processor 34 coupled to a register stack 35, to a random-access memory 36 and to a logic circuit 37. The processor 34 is programmed to perform "exclusive OR" operations on serial data strings or else between them on 16-bit words. The results obtained from the correlations, denoted hereinafter by "correlate", are summed by the logic circuit 37. This circuit provides, for example, a binary value equal to zero when the word which is applied to its input by the processor 34 possesses as many 1 as 0 bits and the decimal values $+8$ or $-8$ if all the bits of the word applied to its input have either the value binary 1 or binary zero respectively. The processing module also comprises an EPROM memory 3 and a dual-access memory 39 serving as an interface with the navigation processor. This module enables two processing operations to be performed on the signals provided by the HF head 1. The first processing operation consists in performing a correlation calculation for the carrier wave provided by the HF head 1 by means of a digital "costas" loop and the second processing operation performs a correlation calculation for the energy spread code. To perform these processing operations, the GPS signal provided by the HF head is assembled into 16-bit words by the register stack 35. The 16-bit words are collected by a software interrupt procedure when the register stack 35 is full. The incident GPS words are next stacked in a software stack 256 words deep, for example. The attraction of the software register stack thus created is that it can be available to N concurrent satellite signal processing processes, each process owning its own pointer for reading the register stack 35. During processing, the processes can thus communicate their results directly to the navigation processor 2. Each code element is delivered to the signal processor 34 in the form of four consecutive bits of the input signal, the value of each four-bit word depending on the phase difference $\Delta\phi$ existing between the GPS wave and the reference clock of the receivers. Under these conditions, the following codings can be adopted: $1100 \rightarrow \Delta\phi = 0°$, $0110 \rightarrow \Delta\phi = +90°$, $0011 \rightarrow \Delta\phi = +180$, $11001 \rightarrow \Delta\phi - 90°$ [sic].

Figure 4:
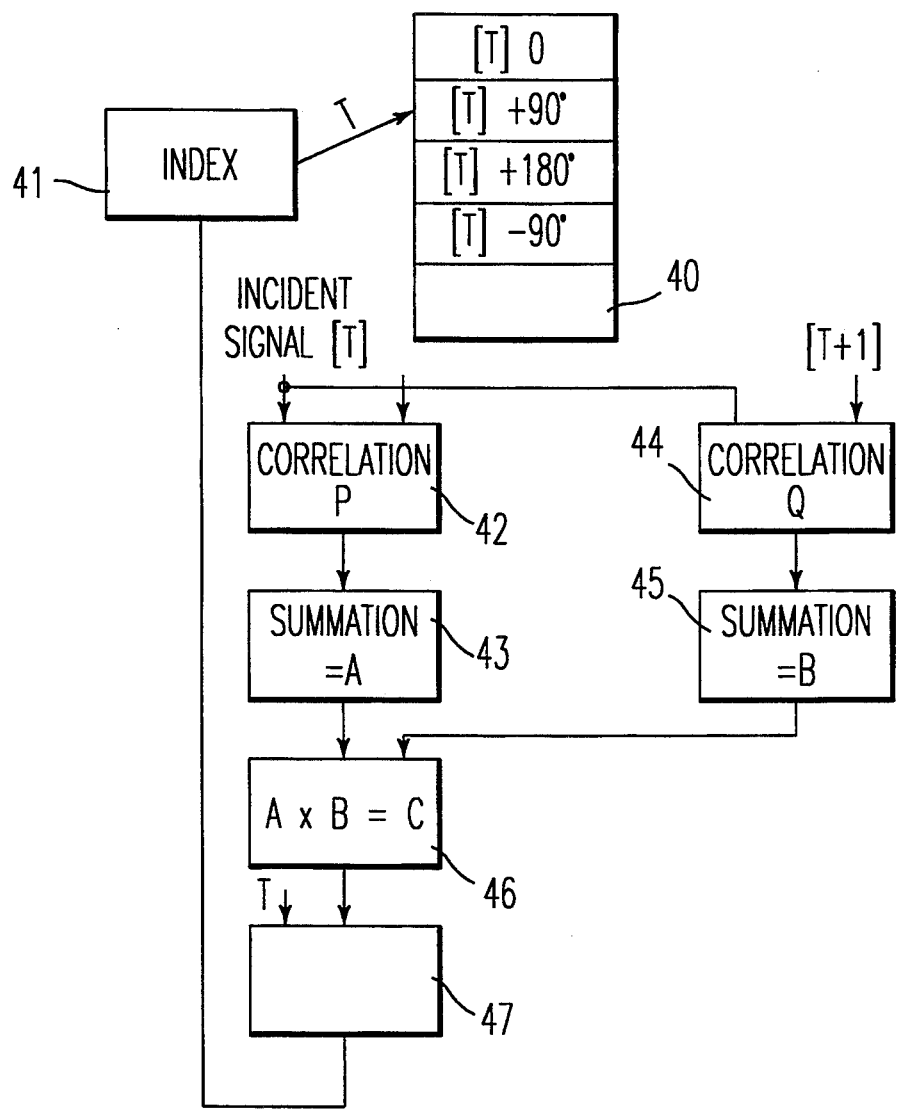

The phase demodulation of the carrier wave can then be performed by correlating the signal put into digital form by the module 3 with the following words:

1100110011001100 → $\Delta\phi = 0°$
0110011001100110 → $\Delta\phi = +90°$
0011001100110011 → $\Delta\phi = +180°$
1001100110011001 → $\Delta\phi = -90°$ This correlation takes place by means of a digital "costas" loop in the manner represented by the processing steps 40 to 47 of FIG. 4. According to the flow diagram represented, at step 40 the phase difference values are stored in a phase table addressed by an index register at step 41. The phase correlation then consists, at step 42, in performing a first correlation P between the incident signal and the phase difference (T) read from the phase table in order to perform, at step 43, a summation A of this "correlate" by means of the logic circuit 37 of FIG. 3. A second correlation Q is performed at step 44 between the incident signal and the phase difference (T+1) indicated at the following address of the phase table 42. A summation B of this "correlate" is performed at step 45. A signed product C of the summations A×B is carried out at step 46. The value T of the index register 41 is incremented at step 47 at each end of execution of step 46 as long as the value of the product C is not zero. When the value C of the product is zero the latching of the processing module effected on the carrier wave is effected and the processing module passes to execution of the code correlation process, the execution steps of which are represented in the flow diagram of FIG. 5. In this process, the code cycle which has a duration of 1 ms is then described by 256 words of 16 bits. The code correlation is performed by an energy correlation at least over one complete code cycle. As the code correlation parameters hardly change during a code cycle, the processing can be performed per full cycle since the shift in the incident code with respect to the local code is always less than the value of one code element over the duration of a cycle. Indeed, losing one code element over a cycle amounts to considering a Doppler effect of one in a thousand, i.e. 1.5 MHz, which is insignificant since the Doppler frequencies at which the receiver operates have characteristics which are one hundred times weaker. Moreover, the code generator is always completely synchronous with the GPS carrier, so that if the costas loop of the receiver is locked, the code positioning prediction made by integrating the Doppler carrier during a code cycle is always exact. In order to execute the process described by flow diagram of FIG. 5, the code elements can be stored in a memory, for example in 8 tables of 256 words of 16 bits, not shown, in such a way that the shift between the same elements of the two consecutive tables, that is to say of two bits, is a code half-element. In each table, the consecutive elements are the 16-bit word truncations of the CA Gold code specific to the satellites tracked. The tables thus constituted can be labelled with an index n included between 1 to 8. In what follows, the symbol G(n)(k) will be used to denote a word of order K in each table n.

Figure 6B:
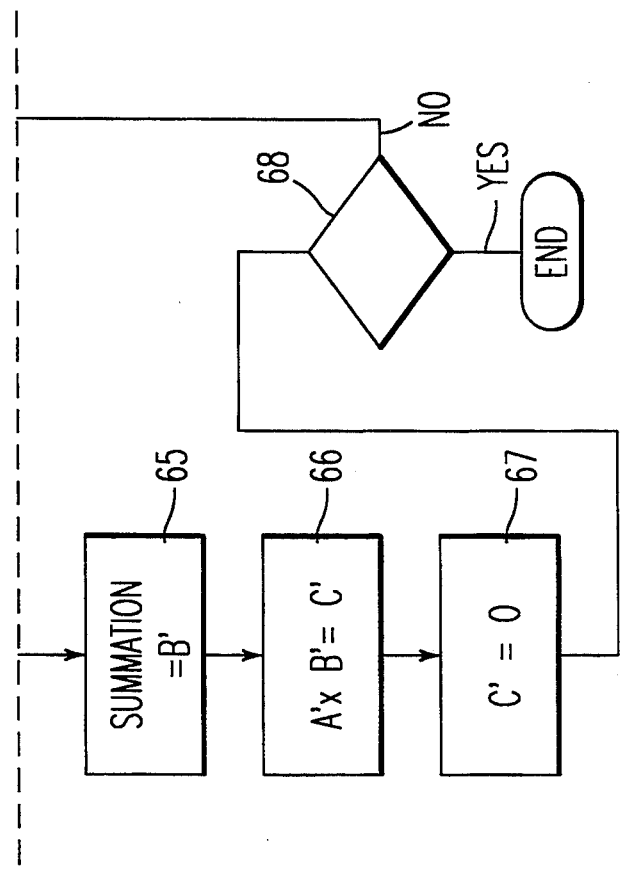

To simplify the calculations and by virtue of the small relative shift existing between the GPS code and the incident code, the number of the table of code used during correlation of a code cycle can be kept constant. Hence, the code/energy correlation during a code cycle is described in the manner represented in steps 48 to 56 of FIG. 5. The index of table n modulo 8 and the phase at the origin k modulo 64 corresponding to the code phase at the start of correlation are computed either by taking into account the results yielded by the digital costas loop of FIG. 4, or by postulating a code phase prepositioning if the system is not yet in satellite tracking mode. At step 49, a cycle of correlation over 256 words of the register stack 35 is performed with the complete contents of the code table of index n−1, starting from position k. The global energy over the "correlates" of the cycle is computed at step 50 by forming the sums A' of the squares of the summations of the "correlates", it being possible to repeat this operation over any number of cycles. The preceding computations are recommenced at steps 51 to 52, starting from table index n+1 and from phase k. The energy B' of summation of the correlates is obtained at step 52. The difference C'=A'−B' of the energies is computed at step 53 so as to check for the presence of an energy maximum in the code loop. When the loop is locked C' equals 0, the phase k is increased by 1 unit at step 56 as long as at step 55 the value C' is not 0. When the GPS receiver is locked onto the carrier of the incident signal by the costas loop, the code loop becomes superfluous if the locking of the code loop has already been achieved. Because the generator of the satellite code is phase-locked onto the satellite carrier, the drift predictions of the costas loop include all drifting of the code loop. However, if the code loop has become superfluous it does not signify that correlation of the GPS code must cease. Indeed, this correlation is the only means of recovering the data modulation from the satellite required to reconstruct its trajectory, this merely signifies that it is possible to check the local code generator with the information for controlling the costas loop, which it is possible to do in a carrier code composite correlator of the type described by steps 57 to 67 of the flow diagram of FIG. 6. In this flow diagram, computation of the phase table pointer T as a function of the current Doppler drift is performed at steps 57 and 58. The table index n and the phase at the origin k corresponding to the code phase at the start of correlation are computed at step 59. At step 60 the phase shift (T) and the order word of the nth table Gnk modulo 2 are appended. A first correlation P between the incident signal and the phase (T) is carried out at step 51 and the summation of this "correlate" is performed at step 62. At step 63 the sum of the phase shift (T+1) and of the word Gnk modulo 2 is carried out. A second correlation Q between the incident signal and the phase value (T+1) is performed at step 64 and the summation of the "correlate" acquisitions is performed at step 65, the product C'=A'×B' of the summations is performed at step 66, and the process is repeated as long as the product C' is not zero.

Naturally, the embodiments of the invention which have just been described are not unique, in particular the global spectral invariance condition which has been fixed in the embodiments described and which has the sole purpose of confining the signal spectrum to the low frequencies in order to facilitate amplification and simplify the structure of the filters by minimising the Q factor, is not imperative. Indeed, in the structure just described, the intermediate frequency filters ensure only the rejection of interference sources outside the GPS band since isolation of the stages relies uniquely on the performance of the encoding. In particular, the noise performance of the receiver is entirely independent of the width of the intermediate frequency filters since this performance is obtained by digital filtering after correlation at baseband processing level. Accordingly, the encoding method described allows great latitude in choice of the passband of the intermediate frequency filters and hence in an extreme case if no specification is imposed on the sensitivity to out-of-band interference it becomes quite possible no longer to use an intermediate frequency filter, merely limiting use to totally aperiodic amplification stages. Under these conditions, whilst accepting that the intermediate frequency filters have a higher passband than the 2 MHz band used earlier, the condition of global invariance in the strict sense of the spectrum can be abandoned if it is admitted that the signal spectrum can be globally shifted or spread by encoding whilst remaining within the passband of the intermediate frequency filters. If the condition of global invariance of the spectrum is no longer imposed, the number of applicable encoding families is increased all the more and hence the list of these families becomes very difficult to determine. However, it is probable that receivers based on encoding algorithms other than those just described would have more complicated structures and would be of much higher cost than the receivers based on the principles described earlier owing to the broadening of the passband of the intermediate frequency filters.

I claim:

1. A satellite radionavigation receiver for receiving satellite signals comprising a signal spectrum of a plurality of lines transmitted by a satellite, comprising:
- a single-frequency conversion stage for frequency converting the received satellite signal spectrum signals;
- an amplifier stage for receiving signal spectrum signals output by the single-frequency conversion stage and comprising:
- a first mixer;
- a first amplifier for receiving signal spectrum signals output by the first mixer;
- a second mixer for receiving signal spectrum signals output by the first amplifier; and
- a second amplifier for receiving signal spectrum signals output by the second mixer;
- an encoding circuit for outputting encoding control signals to the first and second mixers for controlling encoding of the signal spectrum signals output by the first and second mixers and modifying a location of each line of the signal spectrum signals output by the first and second mixers; and
- a navigation processor for receiving signals output by the amplifier stage.

2. The receiver according to claim 1, wherein the encoding takes place by a sample-sign interpolation, wherein each of the lines of the signal spectrum are translated into a line of like amplitude but at a symmetric frequency with respect to a centralized frequency.

3. The receiver according to claim 1, wherein the encoding comprises a pseudo-orthogonal Gold code correlation.

4. The receiver according to any one of claims 1-3, further comprising:
- a first low-pass filter connected between the first mixer and first amplifier; and
- a second low-pass connected between the second mixer and second amplifier.

5. The receiver according to claim 4, wherein pass bands of the first and second low-pass filters are identical.

6. The receiver according to any one of claims 1-3, further comprising a signal-processing processor connected between the amplifier stage and navigation processor and being programmed to perform digital demodulation of the signals output by the amplifier chain.

7. The receiver according to any one of claims 1-3, wherein the signals output by the amplifier stage are C/A code GPS signals encoded by the encoding circuit.

8. The receiver according to claim 6, wherein the signal-processing processor comprises a digital costas loop followed by a digital code-correlation loop.

9. The receiver according to claim 7, wherein the signal-processing processor comprises a digital costas loop followed by a digital code-correlation loop.

* * * * *